(12) United States Patent
Chen

(10) Patent No.: US 10,476,833 B2
(45) Date of Patent: Nov. 12, 2019

(54) WARNING METHOD AND APPARATUS, AND PROCESSING SERVER

(71) Applicant: TENCENT TECHNOLOGY (SHENZHEN) COMPANY LIMITED, Shenzhen (CN)

(72) Inventor: Hao Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 228 days.

(21) Appl. No.: 15/627,204

(22) Filed: Jun. 19, 2017

(65) Prior Publication Data

US 2017/0289091 A1 Oct. 5, 2017

Related U.S. Application Data

(63) Continuation of application No. PCT/CN2016/078567, filed on Apr. 6, 2016.

(30) Foreign Application Priority Data

May 20, 2015 (CN) .......................... 2015 1 0259965

(51) Int. Cl.
*H04L 12/58* (2006.01)
*H04L 29/06* (2006.01)
(Continued)

(52) U.S. Cl.
CPC .............. *H04L 51/32* (2013.01); *H04L 51/30* (2013.01); *H04L 65/80* (2013.01); *H04L 67/26* (2013.01); *H04W 4/90* (2018.02)

(58) Field of Classification Search
CPC ......... H04L 51/32; H04L 51/30; H04L 65/80; H04L 67/26; H04L 29/06; H04L 29/00; H04W 4/90
(Continued)

(56) References Cited

U.S. PATENT DOCUMENTS

2014/0376385 A1 12/2014 Boss et al.
2015/0067832 A1\* 3/2015 Sastry ................... G06F 21/552
726/22
2015/0319138 A1\* 11/2015 Yan ....................... H04L 63/145
726/11

FOREIGN PATENT DOCUMENTS

CN 102981943 A 3/2013
CN 103905222 A 7/2014
(Continued)

OTHER PUBLICATIONS

The State Intellectual Property Office of the People's Republic of China (SIPO) Office Action 1 for 201510259965.7 dated Dec. 30, 2016 pp. 1-9.
(Continued)

*Primary Examiner* — Tu T Nguyen
(74) *Attorney, Agent, or Firm* — Anova Law Group, PLLC

(57) ABSTRACT

Embodiments of the present disclosure provide a warning method, apparatus and a processing server. The method may include: pushing an associated message event to a target official account when the associated message event of the target official account is detected; obtaining abnormal information if the associated message event is not successfully pushed to the target official account; obtaining a warning condition that corresponds to the target official account; generating a warning message according to the abnormal information if the abnormal information satisfies the warning condition, and outputting the warning message to the target official account. By means of the present disclosure, an abnormality in a service process of a target official account can be warned, thereby ensuring that a fault can be resolved in time, an information exchanging process of the target official account is smooth, and service quality of the target official account is improved.

15 Claims, 7 Drawing Sheets

(51) Int. Cl.
*H04L 29/08* (2006.01)
*H04W 4/90* (2018.01)

(58) Field of Classification Search
USPC .......................................................... 709/223
See application file for complete search history.

(56) References Cited

FOREIGN PATENT DOCUMENTS

| | | |
|---|---|---|
| CN | 104125257 A | 10/2014 |
| CN | 104348658 A | 2/2015 |
| CN | 104468249 A | 3/2015 |
| CN | 104601445 A | 5/2015 |
| CN | 104901955 A | 9/2015 |

OTHER PUBLICATIONS

The World Intellectual Property Organization (WIPO) International Search Report for PCT/CN2016/078567 dated Jun. 29, 2016 pp. 1-6.

* cited by examiner

WARNING METHOD AND APPARATUS, AND PROCESSING SERVER

RELATED APPLICATION

This patent application is a continuation application of PCT Patent Application No. PCT/CN2016/078567, filed on Apr. 6, 2016, which claims priority to Chinese Patent Application No. 201510259965.7, entitled "WARNING METHOD AND APPARATUS, AND PROCESSING SERVER," filed on May 20, 2015, the entire contents of both of which are incorporated herein by reference.

FIELD OF THE TECHNOLOGY

The present disclosure relates to the field of internet technology, specifically, to the field of internet application technology, and in particular, to a warning method and apparatus, and a processing server.

BACKGROUND OF THE DISCLOSURE

Internet applications may include but are not limited to: a social application, a game application, an e-commerce application, and the like. The social application refers to an application capable of implementing a social function, and the social application may include but is not limited to: an instant messaging application, a social networking service (SNS) application, or the like. An official account refers to a service account registered by a developer in an internet application. The developer may provide, by using the official account, a service such as message pushing or message subscription for one or more users in the internet application. With the development of internet applications, official accounts accessed to the internet applications are increasing day by day. How to ensure a smooth information exchanging process of an official account to improve service quality of the official account becomes a problem to which attention needs to be paid.

SUMMARY

Embodiments of the present disclosure provide a warning method, apparatus and a processing server, so as to perform warning on an abnormality in a service process of a target official account, thereby ensuring that a fault can be resolved in time, an information exchanging process of the target official account is smooth, and service quality of the target official account is improved.

A first aspect of the embodiments of the present disclosure provides a warning method, which may include: pushing an associated message event to a target official account when the associated message event of the target official account is detected; obtaining abnormal information when the associated message event is not successfully pushed to the target official account; obtaining a warning condition that corresponds to the target official account; generating a warning message according to the abnormal information if the abnormal information satisfies the warning condition; and outputting the warning message to the target official account.

A second aspect of the embodiments of the present disclosure provides a warning apparatus, which may include: at least one processor, a memory, and a plurality of program units stored in the memory to be executed by the at least one processor. The plurality of program units may include: a push unit, configured to push an associated message event to a target official account when the associated message event of the target official account is detected; an abnormal information obtaining unit, configured to obtain abnormal information when the associated message event is not successfully pushed to the target official account; a warning condition obtaining unit, configured to obtain a warning condition that corresponds to the target official account; a message generation unit, configured to generate a warning message according to the abnormal information if the abnormal information satisfies the warning condition; and a warning unit, configured to output the warning message to the target official account.

A third aspect of the embodiments of the present disclosure provides non-transitory computer storage medium, containing computer-executable program for, when being executed by a processor, performing a warning method. The method may include pushing an associated message event to a target official account when the associated message event of the target official account is detected; obtaining abnormal information when the associated message event is not successfully pushed to the target official account; obtaining a warning condition that corresponds to the target official account; generating a warning message according to the abnormal information if the abnormal information satisfies the warning condition, and outputting the warning message to the target official account.

By implementing the embodiments of the present disclosure: abnormal information is obtained when an associated message event cannot be successfully pushed to a target official account, and a warning message is output to the target official account when the abnormal information satisfies a warning condition, so that a developer of the target official account pays attention to the warning message and resolves a service fault in time, thereby ensuring that an information exchanging process of the target official account is smooth, and service quality of the target official account is improved.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

In the embodiments of the present disclosure, internet applications may include but are not limited to: a social application, a game application, an e-commerce application, and the like. The social application refers to an application capable of implementing a social function, and the social application may include but is not limited to: an instant messaging application, an SNS application, or the like. One example of the social application is WECHAT. An official account refers to a service account registered by a developer in an internet application. The developer may provide, by using the official account, a service such as message pushing or message subscription for one or more users in the internet application. One official account may be associated with one server. Specifically, the developer may provide a service such as message pushing or message subscription for a user in the internet application by using the associated server of the official account. The developer may set up rules for message pushing or message subscription through a managing user interface provided by the application server.

The associated server of the official account may be an application server. For example, if a developer of an e-commerce application registers an official account identified as xx in a social application, the associated server of the official account xx may be an application server of the e-commerce application, and the developer of the e-commerce application may provide a service for a user in the social application by using the associated server of the official account xx. The associated server of the official account may also be a web server. For example, if a developer of a game website registers an official account identified as yy in a social application, the developer of the game website provides a service for a user in the social application by using the associated server of the official account yy. The associated server of the official account may further be a third-party platform server. For example, if a developer of a game registers an official account identified as zz in a social application, the developer may authorize a third-party platform to develop instead. In this way, the authorized third party platform server is the associated server of the official account zz, and the developer provides a service for a user in the social application by using the associated server of the official account zz.

Figure 1:
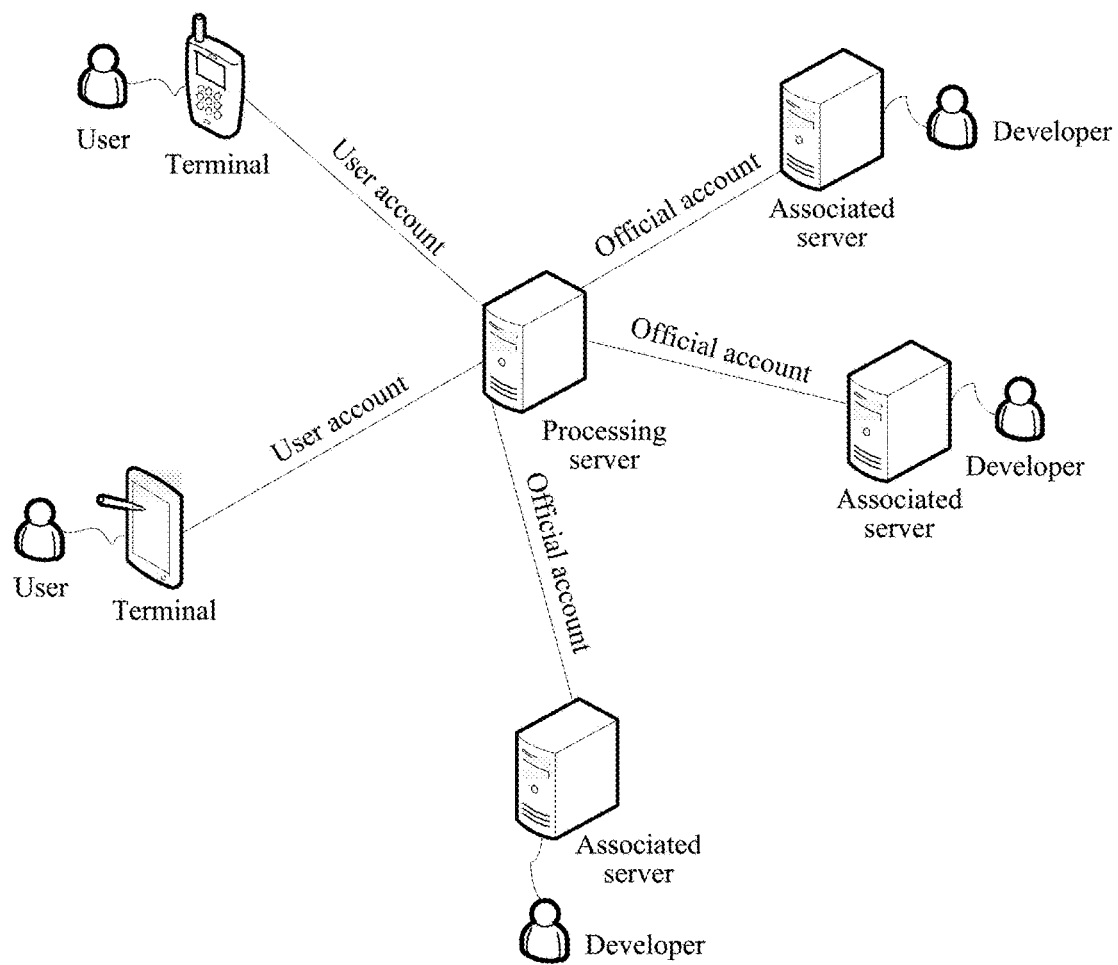
FIG. 1 is a schematic diagram of a system for implementing information exchanging of an official account according to an embodiment of the present disclosure.

Referring to FIG. 1, FIG. 1 is a schematic diagram of a system for implementing information exchanging of an official account according to an embodiment of the present disclosure. The system may include a processing server, at least one terminal corresponding to a user account and at least one associated server of an official account.

The processing server refers to a background server of an internet application, and is configured to handle various requirements in a process of implementing corresponding functions by the internet application, and may be configured to manage related information about a user in the internet application, related information about the official account and exchanged messages between users and between a user and the official account. The related information about the user may include but is not limited to information such as an account, identification, a password or a relationship chain. The related information about the official account may include but is not limited to information such as an account, identification or registration information. The terminal may include but is not limited to a device such as a notebook computer, a mobile phone, a PAD (a tablet computer), a vehicle-mounted terminal or a wearable intelligent device, and the internet application described in this embodiment of the present disclosure may run in the terminal.

In the system shown in FIG. 1, an information exchanging procedure of an official account may include: 1) A user may send a message to an official account by using a terminal, or perform an event associated with the official account (for example, an event of following the official account, or an event of unfollowing the official account), and the associated message event of the official account reaches a processing server; 2) The processing server pushes the associated message event to the official account (specifically forwards to an associated server of the official account); 3) A developer parses the associated message event by using the associated server of the official account, and encapsulates a message that needs to be returned to the user according to a service logic, to return the user message to the processing server; 4) The processing server forwards the user message returned by the official account to the terminal of the user, so that the user may read the message sent by the official account on the terminal.

Figure 2:
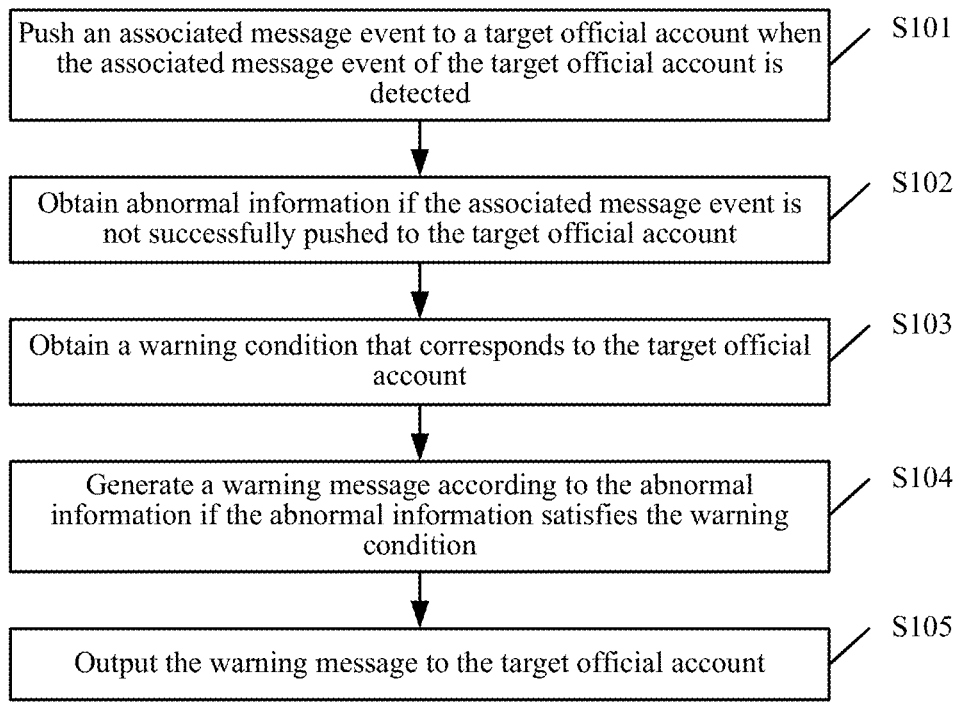
FIG. 2 is a flowchart of a warning method according to an embodiment of the present disclosure.
Figure 3:
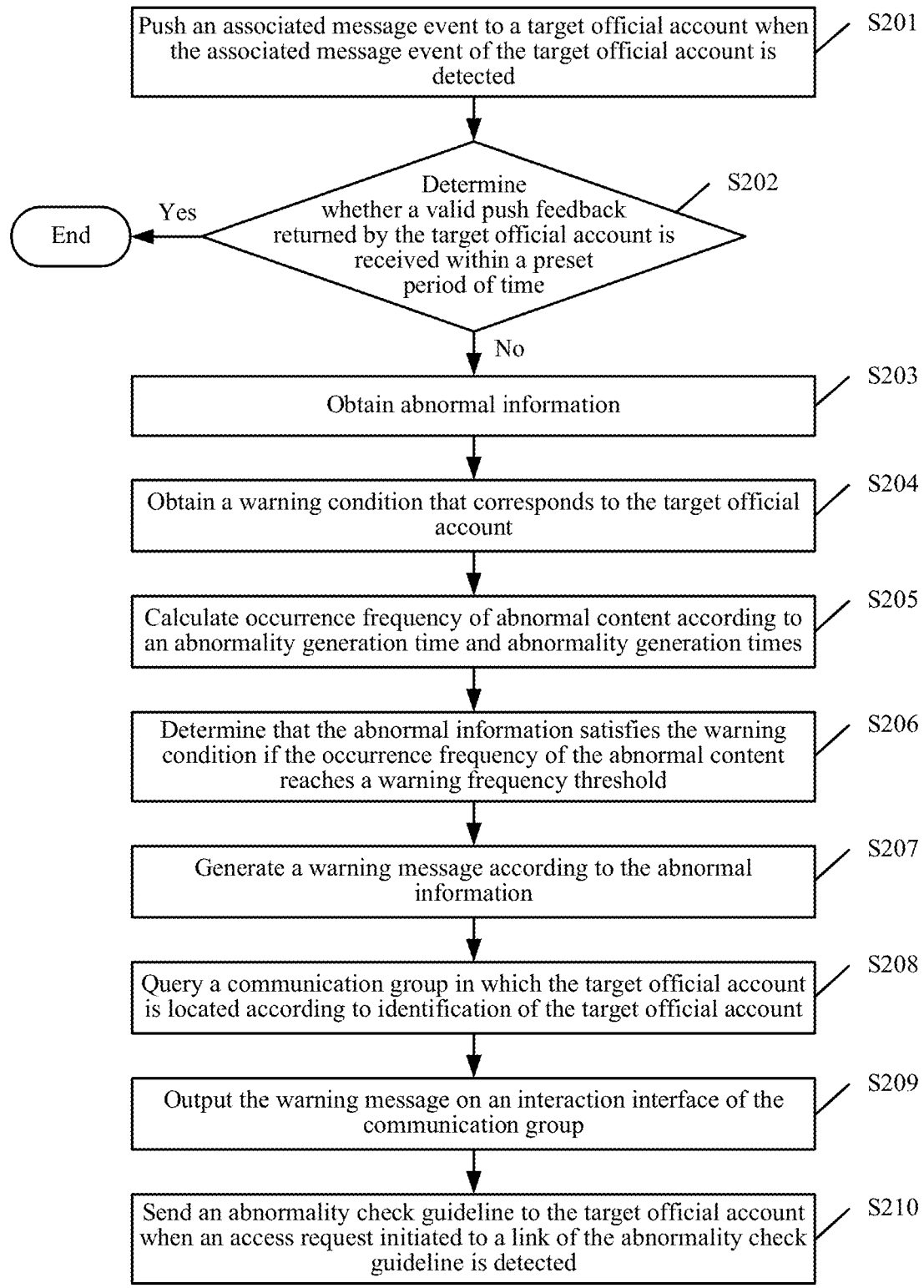
FIG. 3 is a flowchart of another warning method according to an embodiment of the present disclosure.

The following introduces in detail warning methods provided in the embodiments of the present disclosure based on the foregoing descriptions and with reference to FIG. 2 and FIG. 3. Procedures of the methods shown in FIG. 2 and FIG. 3 may be implemented by warning apparatuses provided in the embodiments of the present disclosure, and the apparatuses may run in processing servers.

Referring to FIG. 2, FIG. 2 is a flowchart of a warning method according to an embodiment of the present disclosure. The method may include the following step S101 to step S105.

S101: Pushing an associated message event to a target official account when the associated message event of the target official account is detected.

The target official account is any official account registered in an internet application. A type of the associated message event of the target official account may include but is not limited to: a graphic message, an audio-video message, a geographic location report event, an authentication message, an event of following the target official account, an event of unfollowing the target official account, a subscription event, or the like. In this step, a communications connection may be established to an associated server of the target official account, to push the associated message event of the target official account to the associated server.

S102: Obtaining abnormal information if the associated message event is not successfully pushed to the target official account.

According to a specification in an internet application about an information exchanging procedure of an official account, after a processing server pushes the associated message event of the target official account to the target official account, the associated server of the target official account needs to return a valid push feedback to the processing server within a preset period of time, to indicate that the associated message event is successfully pushed to the target official account. The valid push feedback refers to feedback information returned according to a standard format, aiming at the associated message event pushed by the processing server. In this way, if no valid push feedback returned by the target official account is received within the preset period of time, it is considered that the associated message event is not successfully pushed to the target official account, and abnormal information needs to be obtained.

The abnormal information may include at least one of: an abnormality generation time (i.e., an occurrence time of a failed pushing operation of the associated message event), abnormal content (e.g., reason of the pushing failure), abnormality generation times (i.e., times of occurrences of the failed pushing operation), or a type of the associated message event. The abnormal content may be expressed by using the following Table 1.

mality generation times refers to a quantity of times that the abnormal content appears for, for example: times that a DNS is timeout, or times that a DNS fails. The type of the associated message event may include but is not limited to: a graphic message, an audio-video message, a geographic location report event, an authentication message, an event of following the target official account, an event of unfollowing the target official account, a subscription event, or the like.

S103: Obtaining a warning condition that corresponds to the target official account.

An internet application may provide a configuration interface of the warning condition. A developer may configure the warning condition on the configuration interface provided by the internet application when registering the target official account in the internet application or after successfully registered the target official account. The processing server stores the warning condition configured by the target official account. In this step, the warning condition that corresponds to the target official account may be obtained from storage space of the processing server. The warning condition may include a warning frequency threshold. For example, the warning frequency threshold may be 30 times/5 minutes, indicating that the warning condition is satisfied and warning needs to be performed if same abnormal content appears for at least 30 times within 5 minutes.

S104: Generating a warning message according to the abnormal information if the abnormal information satisfies the warning condition.

The warning message may include at least one of: identification of the target official account, an address of the target official account, the abnormal information, or a link of an abnormality check guideline. The identification of the target official account may include: identification (ID) or a name of the target official account. The address of the target official account may be an Internet Protocol (IP) address, configured by the target official account, of the associated server of the target official account. At least one sort of abnormal content and a solution corresponding to each sort

TABLE 1

Abnormal content table

| Abnormal content | Description |
|---|---|
| DNS failure | DNS parsing fails when pushing an associated massage event to a target official account |
| DNS timeout | DNS parsing is timeout when pushing an associated massage event to a target official account |
| Connection timeout | A connection to an associated server of a target official account is timeout |
| Request timeout | No push feedback is received within a preset period of time after pushing an associated massage event to a target official account |
| Response timeout | A push feedback received within a preset period of time does not satisfy a preset format after pushing an associated massage event to a target official account |
| Automatic shielding | Push is temporarily stopped after the pushing an associated massage event to a target official account fails for multiple times, and the shielding is released after a period |
| Component message push timeout | A third party platform server does not return a push feedback within a preset period of time after pushing a message of the third party platform server (for example, an authorization cancelation message) |
| Component message push failure | A push feedback received within a preset period of time does not satisfy a preset format after pushing a message of a third party platform server (for example, an authorization message) |
| . . . | . . . |

The abnormality generation time refers to a time at which the abnormal content appears/happens, for example: a timestamp at which domain name system (DNS) timeout occurs, or a timestamp at which a DNS failure occurs. The abnorof abnormal content are recorded in the abnormality check guideline. In a specific implementation, the abnormality check guideline may be expressed by using the following Table 2.

TABLE 2

Abnormality check guideline table

| Abnormal content | Solution |
|---|---|
| DNS failure | a) Check whether a domain name is erroneous;<br>b) Check whether the domain name changes, for example, being outdated or updated; |
| Connection timeout | a) Check whether an IP address is erroneous;<br>b) Check whether an associated server corresponding to the IP address is overloaded or over connected;<br>c) Check whether there is a fault with a network operator; |
| Response failure | a) Check whether an IP address is erroneous;<br>b) Check whether the IP address has a network error;<br>c) Check whether a service processing logic does not reply a message according to a specification, or becomes an abnormal logic; |
| Request timeout | a) Check whether an IP address is erroneous;<br>b) Check whether a request processing period is excessively long; |
| . . . | . . . |

In this step, encapsulation may be performed, if the abnormal information satisfies the warning condition, on the abnormal information, the identification of target official account, the address of the target official account and the link of the abnormality check guideline according to a format specification of the warning message, to generate the warning message. The following describes the warning message by using an example, as follows:

Appid: ID "xxxxzz" of a target official account.

Name: "XXXX".

Abnormality generation time: 20XX-02-08-15:00:00.

Abnormal content: A connection to an associated server is timeout, and timeout period is 3 s.

Abnormal occurrences: 4826 times/5 minutes.

Sample: [IP=117.25.149.178] [Type of an associated event message MSG=Unfollow].

Abnormality check guideline reference: http://url.cn/abojinP.

S105: Outputting the warning message to the target official account.

In this step, the warning message is output to the target official account, so that the developer pays attention to the warning message and resolves a fault in time, thereby improving service quality of the target official account.

In this embodiment of the present disclosure, abnormal information is obtained when an associated message event cannot be successfully pushed to a target official account, and a warning message is output to the target official account when the abnormal information satisfies a warning condition, so that a developer of the target official account pays attention to the warning message and resolves a service fault in time, thereby ensuring that an information exchanging process of the target official account is smooth, and service quality of the target official account is improved.

Referring to FIG. 3, FIG. 3 is a flowchart of another warning method according to an embodiment of the present disclosure. The method may include the following step S201 to step S210.

S201: Pushing an associated message event to a target official account when the associated message event of the target official account is detected.

Reference may be made to step S101 in the embodiment shown in FIG. 2 for step S201 in this embodiment, and is not described herein again.

S202: Determining whether a valid push feedback returned by the target official account is received within a preset period of time; if a determining result is that no valid push feedback is received within the preset period of time, determining that the associated message event is not successfully pushed to the target official account, and proceed to step S203; otherwise, determining that the associated message event is successfully pushed to the target official account, and the process ends.

The preset period of time may be set according to an actual requirement. For example, the preset period of time may be 5 minutes or 10 minutes. The valid push feedback refers to feedback information returned according to a standard format, aiming at the associated message event pushed by a processing server. Step S202 may specifically include the following steps S11 to S14:

S11: Determining whether a push feedback returned by the target official account is received within a preset period of time.

S12: Checking whether the received push feedback satisfies a preset format if a push feedback returned by the target official account is received within the preset period of time. The preset format may refer to a standard format, that is, may be an agreed feedback message format between the processing server and the associated server.

S13: Determining that a valid push feedback returned by the target official account is received within the preset period of time if the received push feedback satisfies the preset format.

S14: Determining that no valid push feedback returned by the target official account is received within the preset period of time if no push feedback returned by the target official account is received within the preset period of time, or if the push feedback returned by the target official account and received within the preset period of time does not satisfy the preset format.

S203: Obtaining abnormal information.

If the associated message event is not successfully pushed to the target official account, abnormal information indicating generation of the push abnormality needs to be obtained in this step, and the abnormal information may include: an abnormality generation time, abnormal content, abnormality generation times, and a type of the associated message event. Reference may be made to the foregoing Table 1 for the abnormal content. The abnormality generation time refers to a time at which the abnormal content appears, for example: a time at which DNS timeout occurs, or a time at which a DNS failure occurs. The abnormality generation times refers to times that the abnormal content appears for, for example: times that a DNS is timeout, or times that a DNS fails. The type of the associated message event may include but is not limited to: a graphic message, an audio-video message, a geographic location report event, an authentication message, an event of following the target official account, an event of unfollowing the target official account, a subscription event, or the like.

S204: Obtaining a warning condition that corresponds to the target official account.

Reference may be made to step S103 in the embodiment shown in FIG. 2 for step S204 in this embodiment, and is not described herein again.

S205: Calculating occurrence frequency of the abnormal content according to the abnormality generation time and the abnormality generation times.

The occurrence frequency of the abnormal content may be expressed by using times/period of time. For example, assuming that times that a DNS failure appears for are 100, an initial abnormality generation time is 20XX-02-08-15:00:00, and a final abnormality generation time is 20XX-02-08-15:05:00, the occurrence frequency of the abnormal content is, obtained through calculation, 100 times/5 minutes.

S206: Determining that the abnormal information satisfies the warning condition if the occurrence frequency of the abnormal content reaches a warning frequency threshold.

The warning condition may include a warning frequency threshold. For example, the warning frequency threshold may be 30 times/5 minutes, indicating that the warning condition is satisfied and warning needs to be performed if same abnormal content appears for at least 30 times within 5 minutes. According to the example shown in step S205, assuming that the calculated occurrence frequency of the DNS failure is 100 times/5 minutes, which reaches the warning frequency threshold, it is determined in this step that the abnormal information satisfies the warning condition, and warning needs to be performed on the abnormal content of the DNS failure.

S207: Generating a warning message according to the abnormal information.

The warning message may be used for implementing warning, that is, used for performing a warning prompt to a developer. The warning message may include: identification of the target official account, an address of the target official account, the abnormal information, and a link of an abnormality check guideline. The identification of the target official account may include: ID or a name of the target official account. The address of the target official account may be an IP address, configured by the target official account, of the associated server of the target official account. Reference may be made to the foregoing Table 2 for the abnormality check guideline. At least one sort of abnormal content and a solution corresponding to each sort of abnormal content are recorded in the abnormality check guideline. In this step, encapsulation may be performed on the abnormal information, the identification of target official account, the address of the target official account and the link of the abnormality check guideline according to a format specification of the warning message, so as to generate the warning message. The following describes the warning message by using an example, as follows:

Appid: ID "xxxxzz" of a target official account.
Name: "XXXX".
Initial Abnormality generation time: 20XX-02-08-15:00:00.
Abnormal content: DNS failure.
Abnormal times: 100 times/5 minutes.

Sample: [IP=117.25.149.178] [Type of an associated event message MSG=Unfollow].
Abnormality check guideline reference: http://url.cn/abojinP.

S208: Querying a communication group in which the target official account is located according to the identification of the target official account.

The communication group may include at least one official account, for example: a warning group or an internal bypass group. The communication group in which target official account joins may be queried according to the identification of the target official account.

S209: Outputting the warning message on an interaction interface of the communication group.

In this step, the warning message is output on the interface of the communication group, so that the developer of the target official account pays attention to the warning message and resolves a fault in time, thereby improving service quality of the target official account, and also motivating another official account in the communication group to pay attention to self service quality in time according to the warning message.

Step S208 to step S209 in this embodiment may be detailed steps of step S105 in the embodiment shown in FIG. 2.

S210: Sending an abnormality check guideline to the target official account when an access request initiated to the link of the abnormality check guideline is detected, at least one sort of abnormal content and a solution corresponding to each sort of abnormal content being recorded in the abnormality check guideline.

The warning message includes the link of the abnormality check guideline, and the developer of the target official account may click the link to initiate a request to access the abnormality check guideline. In this step, the abnormality check guideline may be provided for the target official account, so as to help the developer of the target official account resolve a corresponding abnormality or fault as soon as possible, thereby improving service quality of the target official account. It should be understood that another official account in the communication group may obtain the abnormality check guideline in a same manner, so as to help each official account to check a fault, thereby improving service quality of the official accounts.

It can be understood that, the target official account in steps S201-S203 may refer to a target server associated with the target official account. An abnormal pushing incident may occur when a processing server of a social application detects a failed attempt to push the message event to the target server associated with the target official account. The target official account in steps S208-S209 may refer to an associated user client that can receive message from the processing server. For example, the developer may preconfigure one or more user accounts associated with the target official account for receiving the warning message. The user account may be an email address, a phone number, or a user account of the social application. The communication group may be a communication group including multiple user accounts of the social application. Users in the communication group may send and receive messages through an interface provided by the social application.

Figure 8A:
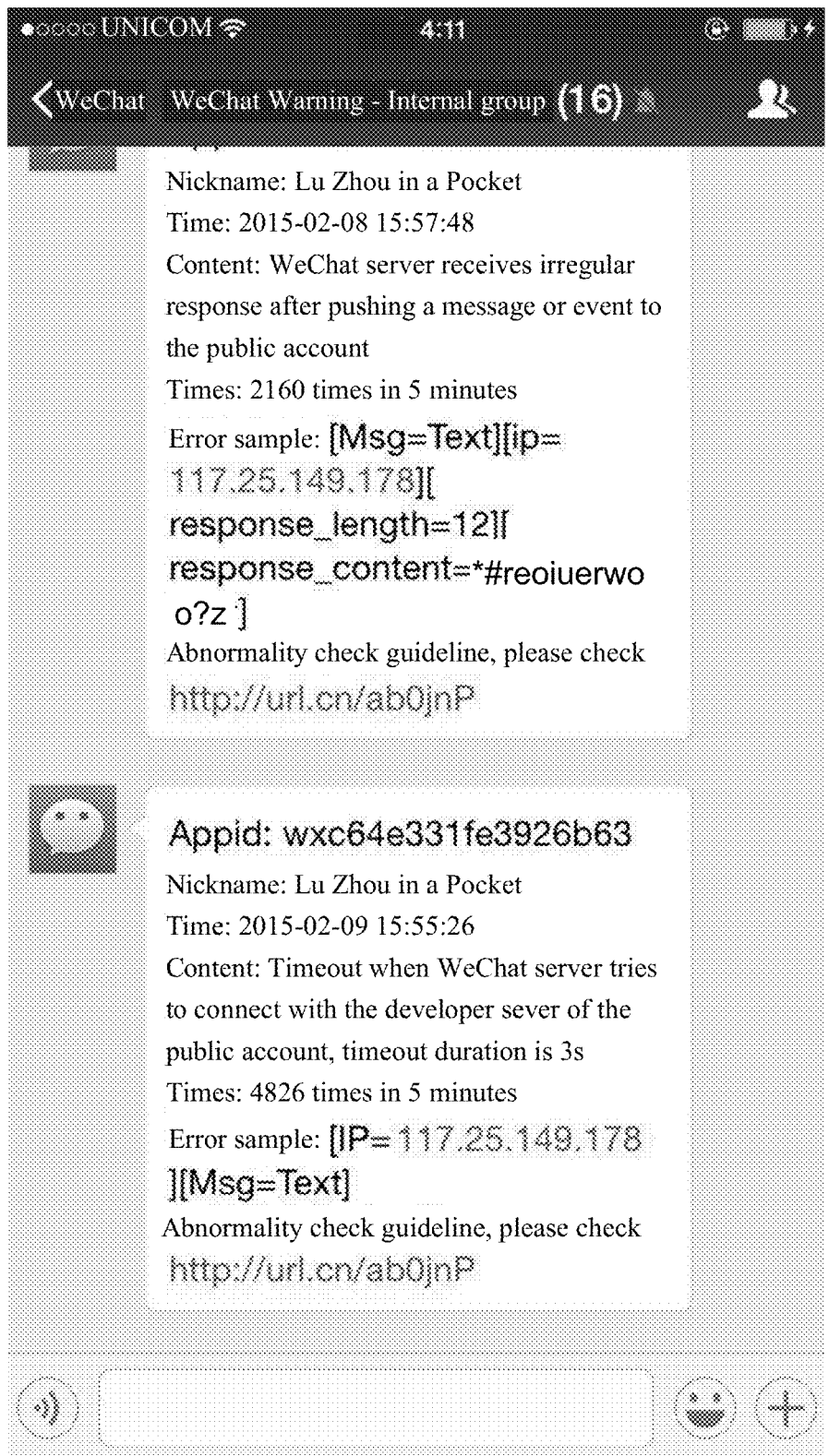
FIG. 8A illustrates an exemplary interaction interface of receiving warning messages in a communication group consistent with a disclosed embodiment of the present disclosure.
Figure 8B:
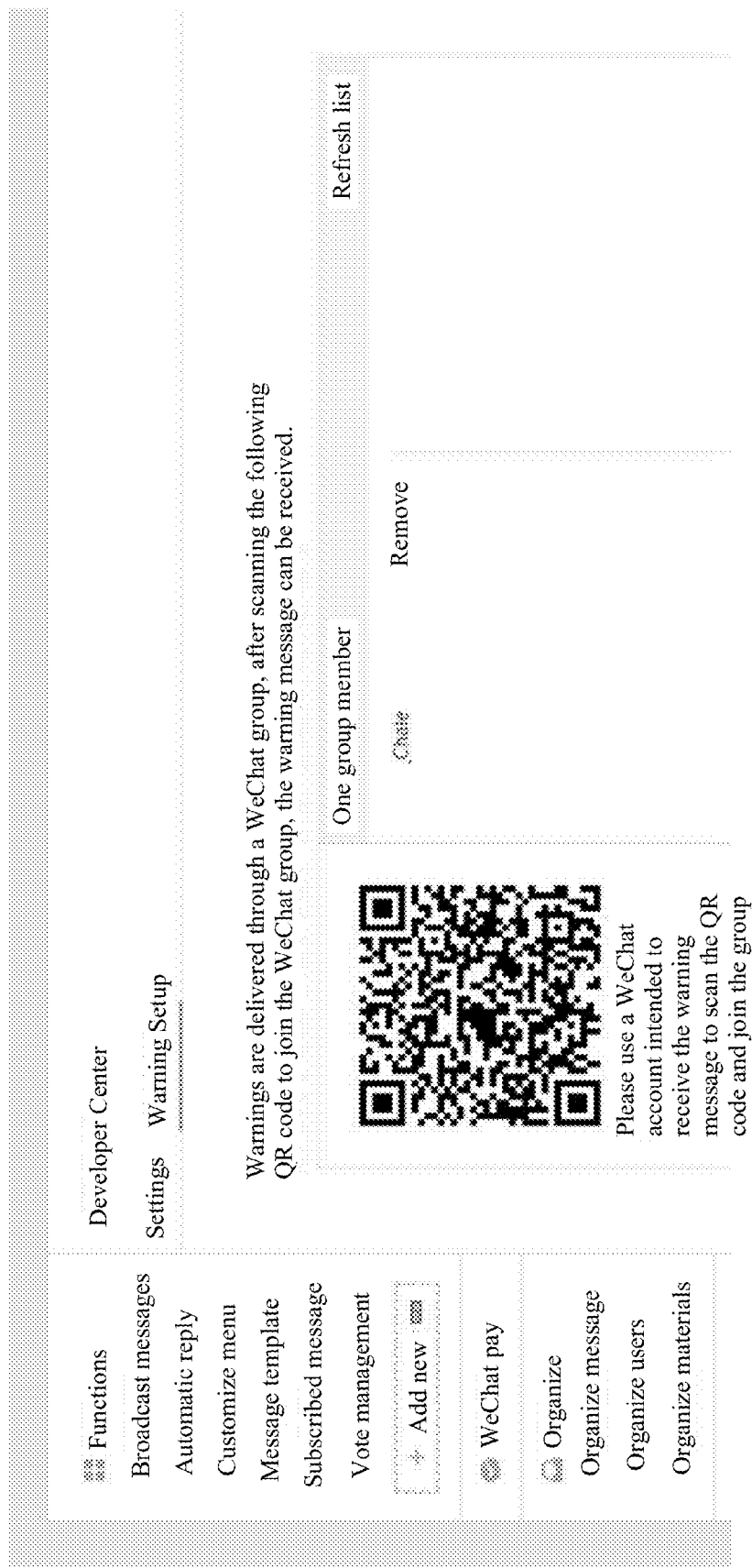
FIG. 8B illustrates an exemplary configuration interface for joining a communication group to receive warning messages consistent with a disclosed embodiment of the present disclosure.

FIG. 8B illustrates an exemplary configuration interface for joining a communication group to receive warning messages. As shown in the figure, the developer may add one or more user accounts as contacts to receive the warning message. FIG. 8A illustrates an exemplary interaction interface of receiving warning messages in a communication group consistent with a disclosed embodiment of the present disclosure. As shown in the figure, after joining the group, the warning message may be sent to the user's WeChat application as an incoming group message, and may be displayed in the interaction interface of the communication group.

In this embodiment of the present disclosure, abnormal information is obtained when an associated message event cannot be successfully pushed to a target official account, and a warning message is output to the target official account when the abnormal information satisfies a warning condition, so that a developer of the target official account pays attention to the warning message and resolves a service fault in time, thereby ensuring that an information exchanging process of the target official account is smooth, and service quality of the target official account is improved.

Figure 4:
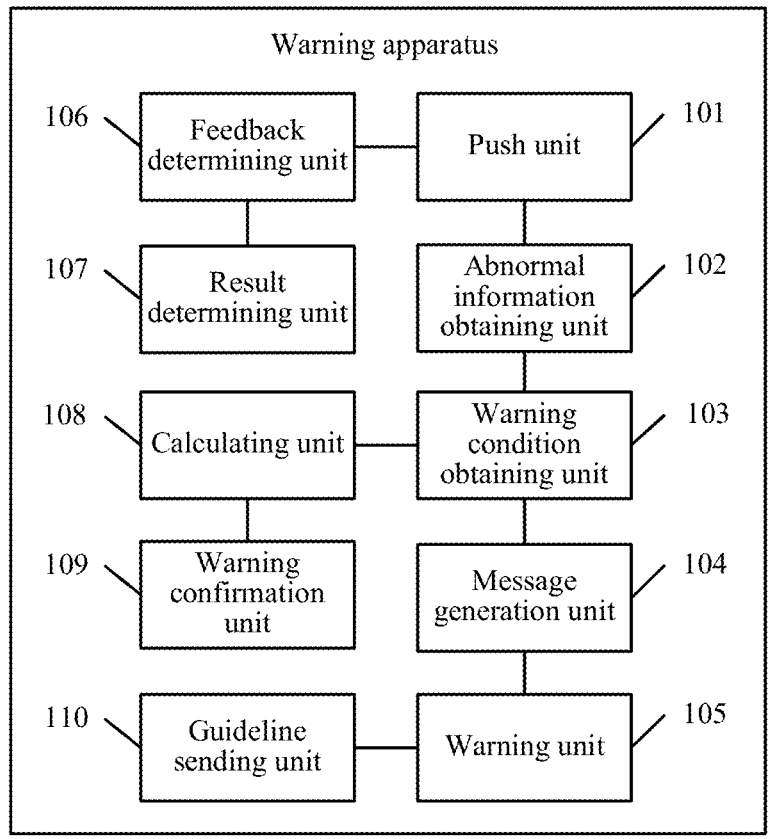
FIG. 4 is a schematic structural diagram of a warning apparatus according to an embodiment of the present disclosure.
Figure 6:
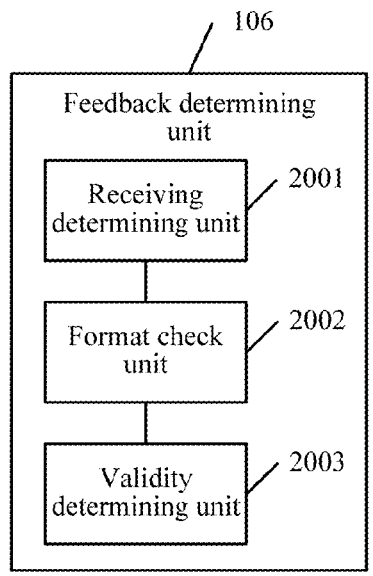
FIG. 6 is a schematic structural diagram of an embodiment of a feedback determining unit shown in FIG. 4.

The following introduces in detail structures and functions of warning apparatuses according to embodiments of the present disclosure with reference to FIG. 4 and FIG. 6. It should be noted that the apparatuses shown in FIG. 4 and FIG. 6 may run in processing servers, so as to be configured to perform the methods shown in FIG. 2 and FIG. 3.

Referring to FIG. 4, FIG. 4 is a schematic structural diagram of a warning apparatus according to an embodiment of the present disclosure. The apparatus may include: a push unit 101, an abnormal information obtaining unit 102, a warning condition obtaining unit 103, a message generation unit 104 and a warning unit 105.

The push unit 101 is configured to push an associated message event to a target official account when the associated message event of the target official account is detected.

The target official account is any official account registered in an internet application. A type of the associated message event of the target official account may include but is not limited to: a graphic message, an audio-video message, a geographic location report event, an authentication message, an event of following the target official account, an event of unfollowing the target official account, a subscription event, or the like. A communications connection may be established between the push unit 101 and an associated server of the target official account, to push the associated message event of the target official account to the associated server.

The abnormal information obtaining unit 102 is configured to obtain abnormal information if the associated message event is not successfully pushed to the target official account.

According to a specification in an internet application about an information exchanging procedure of an official account, after a processing server pushes the associated message event of the target official account to the target official account, the associated server of the target official account needs to return a valid push feedback to the processing server within a preset period of time, to indicate that the associated message event is successfully pushed to the target official account. The valid push feedback refers to feedback information returned according to a standard format, aiming at the associated message event pushed by the processing server. In this way, if no valid push feedback returned by the target official account is received within the preset period of time, it is considered that the associated message event is not successfully pushed to the target official account, and abnormal information needs to be obtained.

The abnormal information may include: an abnormality generation time, abnormal content, abnormality generation times, and a type of the associated message event. The abnormal content may be expressed by using Table 1 in the embodiment shown in FIG. 2. The abnormality generation time refers to a time at which the abnormal content appears, for example: a time at which DNS timeout occurs, or a time at which a DNS failure occurs. The abnormality generation times refers to times that the abnormal content appears for, for example: times that a DNS is timeout, or times that a DNS fails. The type of the associated message event may include but is not limited to: a graphic message, an audio-video message, a geographic location report event, an authentication message, an event of following the target official account, an event of unfollowing the target official account, a subscription event, or the like.

The warning condition obtaining unit 103 is configured to obtain a warning condition that corresponds to the target official account.

An internet application may provide a configuration interface of the warning condition. A developer may configure the warning condition on the configuration interface provided by the internet application when registering the target official account in the internet application or after successfully registered the target official account. The processing server stores the warning condition configured by the target official account. The warning condition obtaining unit 103 may obtain the warning condition that corresponds to the target official account from storage space of the processing server. The warning condition may include a warning frequency threshold. For example, the warning frequency threshold may be 30 times/5 minutes, indicating that the warning condition is satisfied and warning needs to be performed if same abnormal content appears for at least 30 times within 5 minutes.

The message generation unit 104 is configured to generate a warning message according to the abnormal information if the abnormal information satisfies the warning condition.

The warning message may include: identification of the target official account, an address of the target official account, the abnormal information, and a link of an abnormality check guideline. The identification of the target official account may include: ID or a name of the target official account. The address of the target official account may be an IP address, configured by the target official account, of the associated server of the target official account. At least one sort of abnormal content and a solution corresponding to each sort of abnormal content are recorded in the abnormality check guideline. In a specific implementation, the abnormality check guideline may be expressed by using Table 2 in the embodiment shown in FIG. 2. Encapsulation may be performed by the message generation unit 104, if the abnormal information satisfies the warning condition, on the abnormal information, the identification of target official account, the address of the target official account and the link of the abnormality check guideline according to a format specification of the warning message, so as to generate the warning message. The following describes the warning message by using an example, as follows:

Appid: ID "xxxxzz" of a target official account.
Name: "XXXX".
Abnormality generation time: 20XX-02-08-15:00:00.
Abnormal content: A connection to an associated server is timeout, and timeout period is 3 s.
Abnormal times: 4826 times/5 minutes.
Sample: [IP=117.25.149.178] [Type of an associated event message MSG=Unfollow].
Abnormality check guideline reference: http://url.cn/abo-jinP.

The warning unit 105 is configured to output the warning message to the target official account.

The warning unit 105 outputs the warning message to the target official account, so that the developer pays attention to the warning message and resolves a fault in time, thereby improving service quality of the target official account.

Referring to FIG. 4 again, optionally, the apparatus may further include: a feedback determining unit 106 and a result determining unit 107.

The feedback determining unit 106 is configured to determine whether the valid push feedback returned by the target official account is received with the preset period of time.

The preset period of time may be set according to an actual requirement. For example, the preset period of time may be 5 minutes or 10 minutes. The valid push feedback refers to feedback information returned according to a standard format, aiming at the associated message event pushed by the processing server.

A result determining unit 107 is configured to determine that the associated message event is successfully pushed to the target official account if a valid push feedback returned by the target official account is received within the preset period of time; or, configured to determine that the associated message event is not successfully pushed to the target official account if no valid push feedback returned by the target official account is received within the preset period of time.

Referring to FIG. 4 again, optionally, the apparatus may further include: a calculating unit 108 and a warning confirmation unit 109.

The calculating unit 108 is configured to calculate occurrence frequency of the abnormal content according to the abnormality generation time and the abnormality generation times.

The occurrence frequency of the abnormal content may be expressed by using times/period of time. For example, assuming that times that a DNS failure appears for are 100, an initial abnormality generation time is 20XX-02-08-15:00:00, and a final abnormality generation time is 20XX-02-08-15:05:00, the occurrence frequency of the abnormal content is, obtained through calculation, 100 times/5 minutes.

The warning confirmation unit 109 is configured to determine that the abnormal information satisfies the warning condition if the occurrence frequency of the abnormal content reaches the warning frequency threshold.

The warning condition may include a warning frequency threshold. For example, the warning frequency threshold may be 30 times/5 minutes, indicating that the warning condition is satisfied and warning needs to be performed if same abnormal content appears for at least 30 times within 5 minutes. According to the example shown in this embodiment, assuming that the calculated occurrence frequency of the DNS failure is 100 times/5 minutes, which reaches the warning frequency threshold, the warning confirmation unit 109 determines that the abnormal information satisfies the warning condition, and warning needs to be performed on the abnormal content of the DNS failure.

Referring to FIG. 4 again, optionally, the apparatus may further include: a guideline sending unit 110.

The guideline sending unit 110 is configured to send an abnormality check guideline to the target official account when an access request initiated to a link of the abnormality check guideline is detected. At least one sort of abnormal content and a solution corresponding to each sort of abnormal content are recorded in the abnormality check guideline.

The warning message includes the link of the abnormality check guideline, and the developer of the target official account may click the link to initiate a request to access the abnormality check guideline. The guideline sending unit 110 may provide the abnormality check guideline for the target official account, so as to help the developer of the target official account resolve a corresponding abnormality or fault as soon as possible, thereby improving service quality of the target official account.

In this embodiment of the present disclosure, abnormal information is obtained when an associated message event cannot be successfully pushed to a target official account, and a warning message is output to the target official account when the abnormal information satisfies a warning condition, so that a developer of the target official account pays attention to the warning message and resolves a service fault in time, thereby ensuring that an information exchanging process of the target official account is smooth, and service quality of the target official account is improved.

Figure 5:
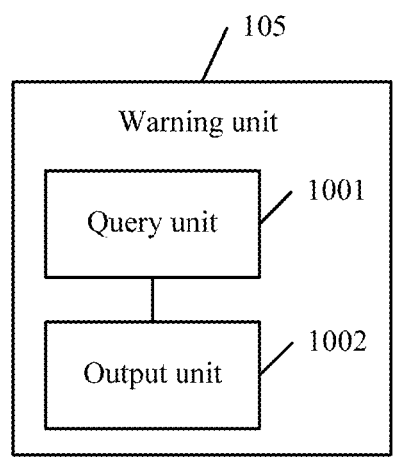
FIG. 5 is a schematic structural diagram of an embodiment of a warning unit shown in FIG. 4.

Referring to FIG. 5, FIG. 5 is a schematic structural diagram of an embodiment of the warning unit shown in FIG. 4. The warning unit 105 may include: a query unit 1001 and an output unit 1002.

The query unit 1001 is configured to query a communication group in which the target official account is located according to the identification of the target official account.

The communication group may include at least one official account, for example: a warning group or an internal bypass group. The query unit 1001 may query a communication group in which target official account joins according to the identification of the target official account.

An output unit 1002 is configured to output the warning message on an interaction interface of the communication group.

The output unit 1002 outputs the warning message on the interface of the communication group, so that a developer of the target official account pays attention to the warning message and resolves a fault in time, thereby improving service quality of the target official account, and also motivating another official account in the communication group to pay attention to service quality of the another official account in time according to the warning message.

In this embodiment of the present disclosure, abnormal information is obtained when an associated message event cannot be successfully pushed to a target official account, and a warning message is output to the target official account when the abnormal information satisfies a warning condition, so that a developer of the target official account pays attention to the warning message and resolves a service fault in time, thereby ensuring that an information exchanging process of the target official account is smooth, and service quality of the target official account is improved.

Referring to FIG. 6, FIG. 6 is a schematic structural diagram of an embodiment of the feedback determining unit shown in FIG. 4. The feedback determining unit 106 may include: a receiving determining unit 2001, a format check unit 2002 and a validity determining unit 2003.

The receiving determining unit 2001 is configured to determine whether a push feedback returned by the target official account is received within a preset period of time. The preset period of time may be set according to an actual requirement. For example, the preset period of time may be 5 minutes or 10 minutes.

The format check unit 2002 is configured to check whether the received push feedback satisfies a preset format if a push feedback returned by the target official account is received within the preset period of time. The preset format may refer to a standard format, that is, may be an agreed feedback message format between a processing server and an associated server.

The validity determining unit 2003 is configured to determine that a valid push feedback returned by the target official account is received within the preset period of time if the received push feedback satisfies the preset format; or, configured to determine that no valid push feedback returned by the target official account is received within the preset period of time if no push feedback returned by the target official account is received within the preset period of time, or if the push feedback returned by the target official account and received within the preset period of time does not satisfy the preset format.

In this embodiment of the present disclosure, abnormal information is obtained when an associated message event cannot be successfully pushed to a target official account, and a warning message is output to the target official account when the abnormal information satisfies a warning condition, so that a developer of the target official account pays attention to the warning message and resolves a service fault in time, thereby ensuring that an information exchanging process of the target official account is smooth, and service quality of the target official account is improved.

This embodiment of the present disclosure further discloses a processing server. The processing server may be the processing server in the embodiment of shown in FIG. 1, and the processing server may include a warning apparatus. Reference may be made to related descriptions in the embodiments shown in FIG. 4 to FIG. 6 for structures and functions of the apparatus, and are not described herein again.

Figure 7:
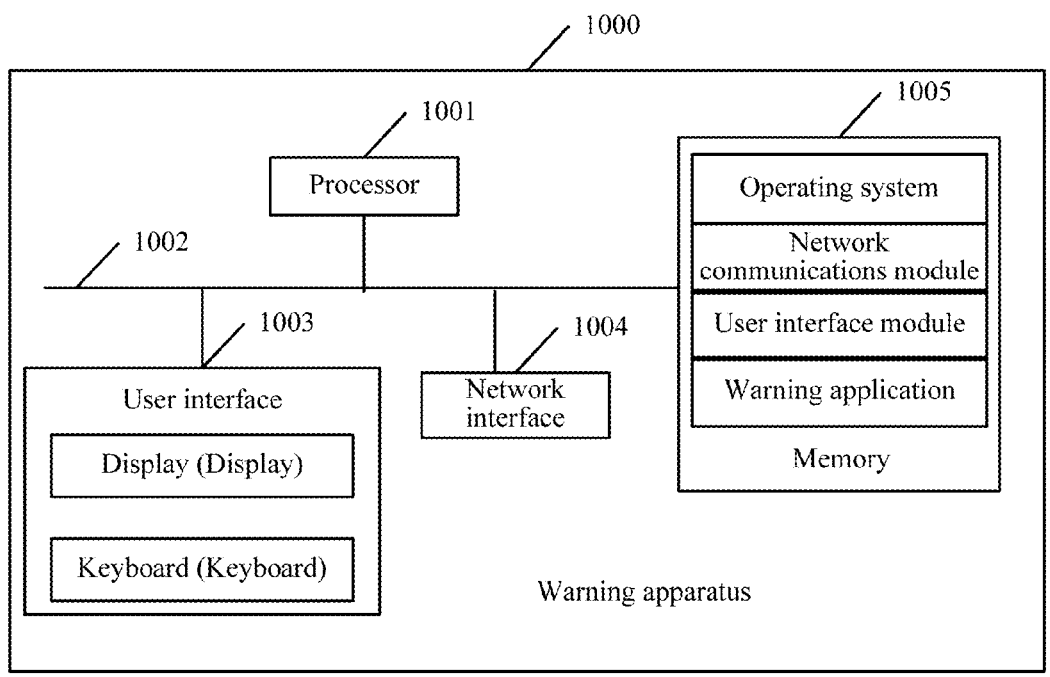
FIG. 7 is a schematic structural diagram of another warning apparatus according to an embodiment of the present disclosure.

An embodiment of the present disclosure further provides another warning apparatus. Referring to FIG. 7, FIG. 7 is a schematic structural diagram of another warning apparatus according to an embodiment of the present disclosure. As shown in FIG. 7, the warning apparatus 1000 may include: at least one processor 1001, for example, a CPU, at least one network interface 1004, a user interface 1003, a memory 1005, and at least one communications bus 1002. The communications bus 1002 is configured to implement connections and communication among there components. The user interface 1003 may include a display (Display) and a keyboard (Keyboard). Optionally, the user interface 1003 may further include a standard wired interface and a wireless interface. Optionally, the network interface 1004 may include a standard wired interface and a wireless interface (for example, a WI-FI interface). The memory 1005 may be a high-speed RAM memory, or may be a non-volatile memory (non-volatile memory), for example, at least one disk memory. Optionally, the memory 1005 may further be at least one storage device away from the foregoing processor 1001. As shown in FIG. 7, the memory 1005 as a computer storage medium may include an operating system, a network communications module, a user interface module and a warning application.

In the warning apparatus 1000 as shown in FIG. 7, the user interface 1003 is mainly configured to provide an input interface for a user, so as to obtain data entered by the user. The processor 1001 may be configured to invoke an warning application stored in the memory 1005, and specifically performs the following operations: pushing an associated message event to a target official account when the associated message event of the target official account is detected; obtaining abnormal information if the associated message event is not successfully pushed to the target official account; obtaining a warning condition that corresponds to the target official account; generating a warning message according to the abnormal information if the abnormal information satisfies the warning condition; and outputting the warning message to the target official account.

In an embodiment, the processor 1001 may be configured to invoke warning application stored in the memory 1005, and specifically performs the following operations: pushing an associated message event to a target official account when the associated message event of the target official account is detected; determining whether a valid push feedback returned by the target official account is received within a preset period of time; if a determining result is not, determining that the associated message event is not successfully pushed to the target official account, and proceeding to obtain abnormal information; otherwise, determining that the associated message event is successfully pushed to the target official account, and the process ends; obtaining a warning condition that corresponds to the target official account; calculating occurrence frequency of abnormal content according to an abnormality generation time and abnormality generation times; determining that the abnormal information satisfies the warning condition if the occurrence frequency of the abnormal content reaches a warning frequency threshold; generating a warning message according to the abnormal information; querying a communication group in which the target official account is located according to the identification of the target official account; outputting the warning message on an interaction interface of the communication group; and sending an abnormality check guideline to the target official account when an access request initiated to the link of the abnormality check guideline is detected, at least one sort of abnormal content and a solution corresponding to each sort of abnormal content being recorded in the abnormality check guideline.

In this embodiment of the present disclosure, abnormal information is obtained when an associated message event cannot be successfully pushed to a target official account, and a warning message is output to the target official account when the abnormal information satisfies a warning condition, so that a developer of the target official account pays attention to the warning message and resolves a service fault in time, thereby ensuring that an information exchanging process of the target official account is smooth, and service quality of the target official account is improved.

A person of ordinary skill in the art may understand that all or some of the procedures of the methods in the foregoing embodiments may be implemented by using a computer program to instruct related hardware. The program may be stored in a computer-readable storage medium, and the procedures of the foregoing method embodiments may be included when the program is performed. The foregoing storage medium may be a magnetic disk, an optical disk, a read-only memory (ROM), a random access memory (RAM), or the like.

The embodiments disclosed above are merely preferred embodiments of the present disclosure, and certainly cannot be used for limiting the protection scope of the present disclosure. Therefore, equivalent variations made according to the claims of the present disclosure shall fall within the protection scope of the present disclosure.

What is claimed is:
1. A warning method, comprising:
pushing an associated message event to a target official account when the associated message event of the target official account is detected;

obtaining abnormal information when the associated message event is not successfully pushed to the target official account;

obtaining a warning condition that corresponds to the target official account;

generating a warning message according to the abnormal information if the abnormal information satisfies the warning condition; and outputting the warning message to the target official account; wherein:

the abnormal information comprises at least one of: an occurrence time of a failed pushing operation of the associated message event, abnormal content, times of occurrences of the failed pushing operation, or a type of the associated message event;

the warning message comprises at least one of: identification of the target official account, an address of the target official account, the abnormal information, or a link of an abnormality check guideline; and the warning condition comprises a warning frequency threshold.

2. The method according to claim 1, after the pushing an associated message event to a target official account when the associated message event of the target official account is detected, further comprising:

determining whether a valid push feedback returned by the target official account is received within a preset period;

determining that the associated message event is successfully pushed to the target official account if a valid push feedback returned by the target official account is received within the preset period; and determining that the associated message event is not successfully pushed to the target official account if no valid push feedback returned by the target official account is received within the preset period.

3. The method according to claim 2, wherein the determining whether a valid push feedback returned by the target official account is received within a preset period comprises:

determining whether a push feedback returned by the target official account is received within the preset period;

checking whether the received push feedback satisfies a preset format if a push feedback returned by the target official account is received within the preset period;

determining that the valid push feedback returned by the target official account is received within the preset period if the received push feedback satisfies the preset format; and determining that no valid push feedback returned by the target official account is received within the preset period if no push feedback returned by the target official account is received within the preset period, or if the push feedback returned by the target official account and received within the preset period does not satisfy the preset format.

4. The method according to claim 1, after the obtaining a warning condition that corresponds to the target official account, further comprising:

calculating an occurrence frequency of the abnormal content according to the occurrence time and the times of the occurrences; and determining that the abnormal information satisfies the warning condition if the occurrence frequency of the abnormal content reaches the warning frequency threshold.

5. The method according to claim 1, wherein the outputting the warning message to the target official account comprises:

querying a communication group in which the target official account is located according to the identification of the target official account; and outputting the warning message on an interaction interface of the communication group.

6. The method according to claim 1, after the outputting the warning message to the target official account, further comprising:

sending an abnormality check guideline to the target official account when an access request initiated to the link of the abnormality check guideline is detected, wherein the abnormality check guideline includes a record of at least one type of abnormal content and a solution corresponding to each type of abnormal content.

7. A warning apparatus, comprising: at least one processor, a memory, and a plurality of program units stored in the memory to be executed by the at least one processor, wherein the at least one processor is configured to:

push an associated message event to a target official account when the associated message event of the target official account is detected;

obtain abnormal information when the associated message event is not successfully pushed to the target official account;

obtain a warning condition that corresponds to the target official account;

generate a warning message according to the abnormal information if the abnormal information satisfies the warning condition; and output the warning message to the target official account; wherein:

the abnormal information comprises at least one of: an occurrence time of a failed pushing operation of the associated message event, abnormal content, times of occurrences the failed pushing operation, or a type of the associated message event;

the warning message comprises at least one of: identification of the target official account, an address of the target official account, the abnormal information, or a link of an abnormality check guideline; and the warning condition comprises a warning frequency threshold.

8. The apparatus according to claim 7, wherein the at least one processor is configured to:

determine whether a valid push feedback returned by the target official account is received within a preset period; and determine that the associated message event is successfully pushed to the target official account if a valid push feedback returned by the target official account is received within the preset period; or, determine that the associated message event is not successfully pushed to the target official account if no valid push feedback returned by the target official account is received within the preset period.

9. The apparatus according to claim 8, wherein the at least one processor is configured to:

determine whether a push feedback returned by the target official account is received within the preset period;

check whether the received push feedback satisfies a preset format if a push feedback returned by the target official account is received within the preset period; and determine that a valid push feedback returned by the target official account is received within the preset period if the received push feedback satisfies the preset format; or, determine that no valid push feedback returned by the target official account is received within the preset period of time if no push feedback returned by the target official account is received within the preset, or if the push feedback returned by the target official account and received within the preset period does not satisfy the preset format.

10. The apparatus according to claim 7, wherein the at least one processor is configured to:
   calculate an occurrence frequency of the abnormal content according to the occurrence timestamp and times of the occurrences; and
   determine that the abnormal information satisfies the warning condition if the occurrence frequency of the abnormal content reaches the warning frequency threshold.

11. The apparatus according to claim 7, wherein the at least one processor is configured to:
   query a communication group in which the target official account is located according to the identification of the target official account; and
   output the warning message on an interaction interface of the communication group.

12. The apparatus according to claim 7, wherein the at least one processor is configured to:
   send an abnormality check guideline to the target official account when an access request initiated to the link of the abnormality check guideline is detected, wherein the abnormality check guideline includes a record of at least one type of abnormal content and a solution corresponding to each type of abnormal content.

13. A non-transitory computer storage medium, containing computer-executable program for, when being executed by a processor, performing a warning method, the method comprising
   pushing an associated message event to a target official account when the associated message event of the target official account is detected;
   obtaining abnormal information when the associated message event is not successfully pushed to the target official account;
   obtaining a warning condition that corresponds to the target official account;
   generating a warning message according to the abnormal information if the abnormal information satisfies the warning condition; and
   outputting the warning message to the target official account; wherein:
      the abnormal information comprises at least one of: an occurrence time of a failed pushing operation of the associated message event, abnormal content, times of occurrences of the failed pushing operation, or a type of the associated message event;
      the warning message comprises at least one of: identification of the target official account, an address of the target official account, the abnormal information, or a link of an abnormality check guideline; and
      the warning condition comprises a warning frequency threshold.

14. The non-transitory computer storage medium according to claim 13, after the pushing an associated message event to a target official account when the associated message event of the target official account is detected, further comprising:
   determining whether a valid push feedback returned by the target official account is received within a preset period;
   determining that the associated message event is successfully pushed to the target official account if a valid push feedback returned by the target official account is received within the preset period; and
   determining that the associated message event is not successfully pushed to the target official account if no valid push feedback returned by the target official account is received within the preset period.

15. The non-transitory computer storage medium according to claim 13, after the obtaining a warning condition that corresponds to the target official account, further comprising:
   calculating an occurrence frequency of the abnormal content according to the occurrence time and the times of the occurrences; and
   determining that the abnormal information satisfies the warning condition if the occurrence frequency of the abnormal content reaches the warning frequency threshold.

* * * * *